Nov. 7, 1933.    A. L. FREEDLANDER    1,933,899
BELT
Filed April 16, 1931

INVENTOR
ABRAHAM L. FREEDLANDER.
BY
ATTORNEY

Patented Nov. 7, 1933

1,933,899

UNITED STATES PATENT OFFICE 1,933,899

BELT

Abraham L. Freedlander, Dayton, Ohio

Application April 16, 1931. Serial No. 530,532

3 Claims. (Cl. 74—63)

My invention relates to belts.

It is the object of my invention to provide a solid rubber core, preferably of general trapezoid section and to wind around that core concentrically straight laid fabric interleaved with rubber, to mold the resulting body which is circular in section into trapezoid section, thereby having the wrapper formed of an integral piece of straight laid fabric that also constitutes the body of the belt extending from the core to the outside of the belt.

It is my object to provide a layer of rubber between said straight laid fabric which will accommodate its movements, accommodate the compression and tension strains, providing a belt that will remain seated in pulleys without buckling or warping.

Referring to the drawing, Figure 1 is a section through the belt as finally manufactured prior to the last step of molding to trapezoid form and vulcanizing.

Figure 1:
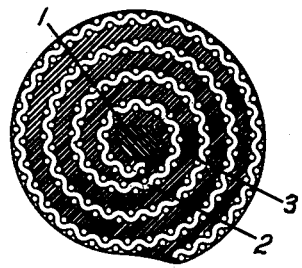
Figure 2:
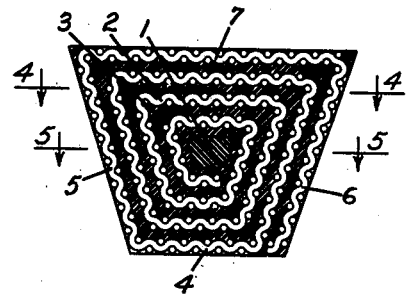
Figure 2 is a similar view showing the belt in section after being molded to trapezoid form and vulcanized.
Figure 3:
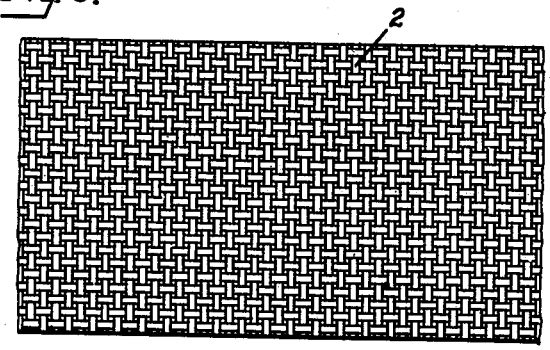
Figure 3 is a top plan view of the straight laid fabric as it appears on top of the belt, or the sides or bottom thereof, as in Figure 2.
Figure 4:
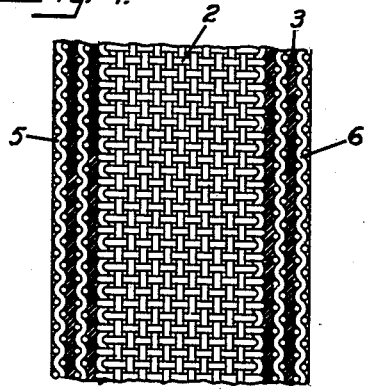
Figure 4 is a section on the line 4—4 of Figure 2.
Figure 5:
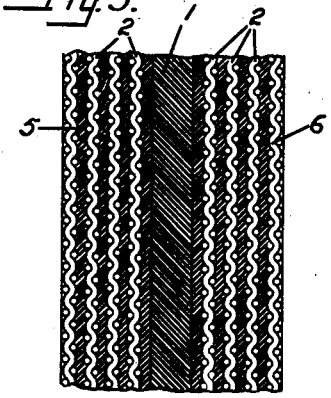
Figure 5 is a section on the line 5—5 of Figure 2.

Referring to the drawing, 1 is a hard core of rubber that is molded to preferably trapezoid form. About this core is wrapped a layer of straight laid fabric 2 with a part of its threads transverse to the longitudinal axis of the belt and the other part parallel thereto. This layer of straight laid fabric is interleaved with rubber of approximately 3 until a sausage like structure of approximately the dimensions of the belt desired is formed. The resulting product has the appearance of a rope. The belt is then molded to a trapezoid form as in Figure 2 and vulcanized. The result of this molding is to arrange the fabric in a succession of concentric layers extending continuously from the center of the belt to the exterior, the layers being substantially trapezoid in section. Thus the bottom outside layer 4, the side layers 5 and 6, and the top layer 7 constitute the wrapper of the belt.

The rubber sections 3 which are likewise formed from a continuous strip of rubber extending from the center of the belt outwardly, form a resilient cushion between the straight laid fabric layers to permit the belt to have all resiliency necessary to accommodate itself to compression and tension strains without warping, bending or buckling, while at the same time having the advantage of the strength and inextensible character of the straight laid fabric.

The rubber core 1 is made of relatively inextensible material forming a backbone or neutral axis member that prevents the belt from stretching longitudinally, while not preventing the portion of the belt beneath it compressing and the portion of the belt above it extending, both to a limited degree.

It is my object to furnish the core 1 of relatively non-resilient flexible material of entirely different character from the rubber used for the body of the belt, which is preferably of non-revertible rubber of relatively great resiliency.

I desire to comprehend within my invention such modifications as may be clearly embraced within my claims and the scope of my invention.

Having thus fully described my invention, what I claim as new and desire to secure by Letters Patent, is:

1. In a belt, a relatively non-resilient hard core of rubber, a relatively soft body of rubber molded there-around in trapezoid section, and a concentrically wound spaced straight laid fabric member extending from adjacent the core to the exterior of the belt to form a wrapper therefor, and a reinforcement throughout the relatively resilient body of the belt.

2. In a belt, a relatively hard and inextensible rubber core member forming a neutral axis and a relatively soft resilient rubber body forming a belt body member having tension and compression sections, and fabric reinforcement for said body member equally arranged in all points of the body member with respect to the core.

3. In a belt, a relatively hard and inextensible rubber core member forming a neutral axis and a relatively soft resilient rubber body forming a belt body member having tension and compression sections, and fabric reinforcement for said body member equally arranged in all points of the body member with respect to the core, said reinforcement comprising straight laid fabric with a portion of the threads parallel to the longitudinal axis of the core and another portion transverse thereto.

ABRAHAM L. FREEDLANDER.